United States Patent
Hong et al.

(10) Patent No.: US 11,731,274 B2
(45) Date of Patent: Aug. 22, 2023

(54) PREDICTIVE TIME HORIZON ROBOTIC MOTION CONTROL

(71) Applicant: Ford Global Technologies, LLC, Dearborn, MI (US)

(72) Inventors: Sanghyun Hong, Ann Arbor, MI (US); Jianbo Lu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 248 days.

(21) Appl. No.: 17/211,494

(22) Filed: Mar. 24, 2021

(65) Prior Publication Data

US 2022/0305657 A1    Sep. 29, 2022

(51) Int. Cl.
  B25J 9/16    (2006.01)
  B25J 13/08    (2006.01)

(52) U.S. Cl.
  CPC ........... B25J 9/1666 (2013.01); B25J 9/1651 (2013.01); B25J 13/089 (2013.01)

(58) Field of Classification Search
  CPC ...... B25J 9/1666; B25J 9/1651; B25J 13/089; G05D 1/0278; G05D 1/0223; B60W 30/0953; B60W 30/095; B60W 2520/10
  See application file for complete search history.

(56) References Cited

U.S. PATENT DOCUMENTS

| | | | |
|---|---|---|---|
| 9,254,571 B2 * | 2/2016 | Hyung | G05D 1/024 |
| 10,310,506 B1 * | 6/2019 | Qi | A45C 13/28 |
| 10,894,322 B2 * | 1/2021 | Komlósi | B25J 9/1664 |
| 11,016,491 B1 * | 5/2021 | Millard | G05D 1/0274 |
| 11,556,135 B2 * | 1/2023 | Takaki | B60W 30/162 |
| 2010/0168950 A1 * | 7/2010 | Nagano | B25J 9/1666 |
| | | | 701/25 |

(Continued)

FOREIGN PATENT DOCUMENTS

CN    103558856 A    2/2014
KR    102049962 B1 *    11/2019

OTHER PUBLICATIONS

Hong et al., "Following a Dynamic Object Through a Transient Response Adjustable MPC", 8 pgs., Aug. 3, 2020.

(Continued)

*Primary Examiner* — Adam R Mott
*Assistant Examiner* — Sagar Kc
(74) *Attorney, Agent, or Firm* — Brandon Hicks; Eversheds Sutherland (US) LLP

(57) ABSTRACT

Present embodiments describe a method for controlling a robotic vehicle that can include causing a processor to determine a localized position of a dynamic object, determining, via the processor, a predicted trajectory of the robotic vehicle based on the localized position of the dynamic object, and determining an optimum trajectory based on the predicted trajectory, the optimum trajectory chosen based a travel velocity and longitudinal velocity. Determining the optimum trajectory can include computing a cost value comprising a plurality of cost terms associated with the optimum trajectory, and determining a control command that modifies a travel velocity and a travel vector of the robotic vehicle based on the cost value. The method further includes causing, via the processor, the robotic vehicle to follow the optimal trajectory based on the control command.

12 Claims, 9 Drawing Sheets

(56) References Cited

U.S. PATENT DOCUMENTS

| | | | |
|---|---|---|---|
| 2012/0010772 A1* | 1/2012 | Pack | G05D 1/0088 |
| | | | 701/27 |
| 2014/0018994 A1* | 1/2014 | Panzarella | G05D 1/0248 |
| | | | 701/25 |
| 2015/0073646 A1 | 3/2015 | Rosenstein et al. | |
| 2015/0120057 A1 | 4/2015 | Wong et al. | |
| 2016/0129907 A1* | 5/2016 | Kim | B60W 30/09 |
| | | | 701/26 |
| 2019/0155292 A1* | 5/2019 | Gutmann | B60W 60/0013 |
| 2019/0187703 A1* | 6/2019 | Millard | G01C 21/20 |
| 2019/0354109 A1* | 11/2019 | Pierson | G05D 1/0223 |
| 2020/0047337 A1* | 2/2020 | Williams | B25J 9/163 |
| 2020/0064850 A1 | 2/2020 | Hong et al. | |
| 2020/0139967 A1* | 5/2020 | Beller | G05D 1/0223 |
| 2020/0174481 A1* | 6/2020 | Van Heukelom | G06N 3/044 |
| 2021/0094539 A1* | 4/2021 | Beller | G08G 1/167 |
| 2021/0101293 A1* | 4/2021 | Kobayashi | G05D 1/0246 |
| 2021/0294340 A1* | 9/2021 | Zhou | G05D 1/0217 |
| 2022/0305657 A1* | 9/2022 | Hong | B25J 9/1666 |

OTHER PUBLICATIONS

Wang et al., "Dynamic Object Tracking Control for a Non-Holonomic Wheeled Autonomous Robot", Tamkang Journal of Science and Engineering, vol. 12, No. 3, pp. 339-350, Sep. 2009.

* cited by examiner

PREDICTIVE TIME HORIZON ROBOTIC MOTION CONTROL

BACKGROUND

In an environment mixing pedestrians, bicycles, e-scoots, and cars (e.g., in a densely populated urban centers) a robust follow-me delivery robot needs to follow a leading person with different walking behaviors (e.g., speeds and directions) statically determined by their personal preferences. On the other hand, the delivery robot also needs to deal with the changing behavior of the leading person due to their response to the dynamically changing environment.

Hence, to accomplish a robust following motion, a follow-me delivery robot should not only account for a simply learned average behavior of the leading person, but also accommodate changes made by the leading person in response to the environment. If the walking pace adopted by the delivery robot is faster than the leading person, the delivery bot will exhibit intermittent speeding and slowing actions. If the robot's walking pace is slower than the leading person, the delivery bot will have sluggish response and may lose the leading person.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Illustrative Embodiments

The disclosure will be described more fully hereinafter with reference to the accompanying drawings, in which example embodiments of the disclosure are shown, and not intended to be limiting.

Human-robot interaction is increasingly important as robotic vehicles are used to perform tasks in an environment with nearby humans. The robotic vehicles can fulfill tasks quickly and safely when programmed for such human-robotic interactions. One way in which robotic vehicles may interact with humans can include following robots that track the dynamically changing position of a human target.

For example, if a robotic vehicle follows a delivery person with packages loaded onboard the vehicle as cargo, following distance should be maintained within a reasonable range for delivery efficiency. The robotic vehicle should be able to regulate its maneuverability to ensure safety of the vehicle and cargo loaded onboard the vehicle. Following functionality may also be important when the robotic vehicle follows another robotic vehicle.

The leading vehicle or human target may walk or operate at dynamic speeds and directions. To follow a dynamic object, robotic vehicles utilize object tracking algorithms that cause the processors/controllers to recognize locations of the target object, and motion control algorithms that execute commands causing the robotic vehicle to follow the dynamic object in an appropriate manner. For a successful following motion control, finding an optimal control commands may balance navigation cost (e.g., time and actuation) and safety (e.g., collision avoidance and safe cornering) before potential risks are imminent.

There are several approaches used for motion control of robotic vehicles that can include, for example, Dynamic Window Approach (DWA) and Trajectory Rollout (TR), that are based on an optimal control framework. However, conventional approaches for motion control are mainly focused on reaching a goal without taking into account safe maneuverability of the robotic vehicle, response speed, and tight path following.

Aspects of the present disclosure describe a robotic vehicle motion controller having a predictive optimal control framework that may enable an autonomous robotic vehicle to follow a highly dynamic object that changes position, pace, and direction of travel continuously and drastically. The control framework may allow the robotic vehicle to account for the highly dynamic motion of the object being followed, such as a human, by adjusting the robotic vehicle response speed.

Additionally, the robotic vehicle may be configured and/or programmed to avoid collisions with obstacles and prevent loss of control, which may improve safety pedestrians and objects in the robotic vehicle's operation environment of, as well as the robot itself. Furthermore, the robotic vehicle controller described herein may include motion control commands that can be computed in real-time without overruns.

Figure 1:
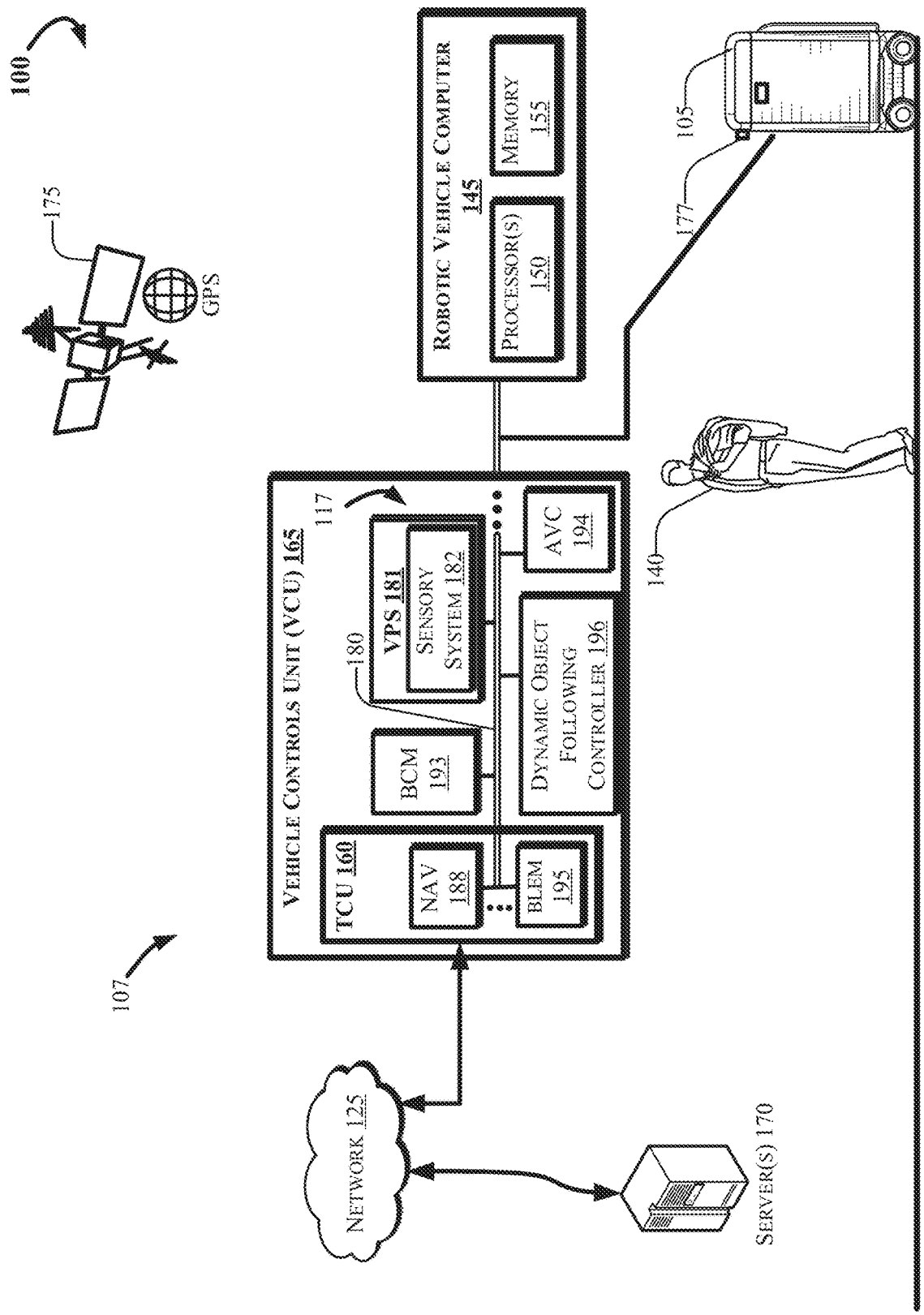
FIG. 1 depicts an example computing environment in which techniques and structures for providing the systems and methods disclosed herein may be implemented.

FIG. 1 depicts an example computing environment 100 that can include a robotic vehicle 105. The robotic vehicle 105 can include a robotic vehicle computer 145, and a Vehicle Controls Unit (VCU) 165 that typically includes a plurality of electronic control units (ECUs) 117 disposed in communication with the robotic vehicle computer 145, which may communicate via one or more wireless connection(s), and/or may connect with the robotic vehicle 105 directly using near field communication (NFC) protocols, Bluetooth® protocols, Wi-Fi, Ultra-Wide Band (UWB), and other possible data connection and sharing techniques.

Although not utilized according to embodiments described hereafter the robotic vehicle 105 may also receive and/or be in communication with a Global Positioning System (GPS) 175. The GPS 175 may be a satellite system (as depicted in FIG. 1) such as the global navigation satellite system (GLNSS), Galileo, or navigation or other similar system. In other aspects, the GPS 175 may be a terrestrial-based navigation network, or any other type of positioning technology known in the art of wireless navigation assistance.

The robotic vehicle computer 145 may be or include an electronic vehicle controller, having one or more processor(s) 150 and memory 155. The robotic vehicle computer 145 may, in some example embodiments, be disposed in communication with one or more server(s) 170. The server(s) 170 may be part of a cloud-based computing infrastructure, and may be associated with and/or include a Telematics Service Delivery Network (SDN) that provides digital data services to the robotic vehicle 105 and other vehicles (not shown in FIG. 1) that may be part of a robotic vehicle fleet.

Although illustrated as a four-wheeled delivery robot, the robotic vehicle 105 may take the form of another robot chassis such as, for example, a two-wheeled vehicle, a multi-wheeled vehicle, a track-driven vehicle, etc., and may be configured and/or programmed to include various types of robotic drive systems and powertrains. Methods of training a deep reinforcement learning algorithm using a predictive time horizon robotic motion control system 107, which may cause the robotic vehicle 105 to follow a dynamic object such as the dynamic object 140 or another robotic vehicle (not shown), even when the target changes its behavior unpredictably and dynamically.

The network(s) 125 illustrate an example of communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The robotic vehicle computer 145 may be installed in an interior compartment of the robotic vehicle 105 (or elsewhere in the robotic vehicle 105) and operate as a functional part of the Predictive time horizon robotic motion control system 107, in accordance with the disclosure. The robotic vehicle computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a dynamic object following program code. The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

For example, the memory may store programming code for causing the processor 150, via the VCU 165 to determine a localized position of a dynamic object such as the dynamic object 140 or another robotic vehicle (not shown in FIG. 1). The programming code may cause the processor 150 to determine a predicted trajectory of the robotic vehicle 105 based on the localized position of the dynamic object, and determine an optimum trajectory based on the predicted trajectory. In some aspects, the optimum trajectory is chosen based on a travel velocity and longitudinal velocity associated with movements of the robotic vehicle 105, which the programming code may obtain from the vehicle BCM 193, the TCU 160, or via other means such as an inertial measurement unit or other sensory device associated with the sensory system 182. Accordingly, the programming code may cause the processor 150 to compute a cost value having a plurality of cost terms associated with the optimum trajectory, and determine a control command that modifies a travel velocity and travel vector of the robotic vehicle 105 based on the cost value. The programming code may further cause the processor 150 to follow the optimal trajectory based on the programming code by pushing the control command to the BCM 193, among other robotic vehicle systems.

The VCU 165 may share a power bus (not shown in FIG. 1) with the robotic vehicle computer 145, and may be configured and/or programmed to coordinate the data between vehicle 105 systems (such as the control command, for example). The VCU 165 may connect with one or more servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193. The VCU 165 may further include and/or communicate with a Vehicle Perception System (VPS) 181, having connectivity with and/or control of one or more vehicle sensory system(s) 182. In some aspects, the VCU 165 may control operational aspects of the robotic vehicle 105, and implement one or more instruction sets operational as part of the Predictive time horizon robotic motion control system 107. The VPS 181 may be disposed in communication with a dynamic object following controller 196.

The VPS 181 may include a LIDAR device, a sonar device, an IR camera, an RGB camera, an inertial measurement unit (IMU), and/or other sensing devices disposed onboard the vehicle, which may be used by the dynamic object following controller 196 to sense vehicle location, sense the location of a dynamic target such as the dynamic object 140 or another robotic vehicle, and follow an optimal trajectory that maintains a safe but efficient distance between the robotic vehicle 105 and the dynamic target.

The TCU 160 can be configured and/or programmed to provide vehicle connectivity to wireless computing systems onboard and offboard the robotic vehicle 105, and may include a Navigation (NAV) receiver 188 for receiving and processing a GPS signal from the GPS 175, a Bluetooth® Low-Energy (BLE) Module (BLEM) 195, a Wi-Fi transceiver, an Ultra-Wide Band (UWB) transceiver, and/or other wireless transceivers (not shown in FIG. 1) that may be configurable for wireless communication between the robotic vehicle 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests.

The VCU 165 may control various loads directly via the bus 180 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human teleoperators, inputs from the AVC 194, the Predictive time horizon robotic motion control system 107, and/or via wireless signal inputs received via the wireless connection(s) 130 from other connected devices. The ECUs 117, when configured as nodes in the bus 180, may each include a central processing unit (CPU), a CAN controller, and/or a transceiver (not shown in FIG. 1).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1). The BCM 193 may further include robot power management circuitry that can control power distribution from a power supply (not shown in FIG. 1) to the robotic vehicle 105 components.

The BCM 193 may coordinate any one or more functions from a wide range of vehicle functionality, including energy management systems, alarms, vehicle immobilizers, driver and rider access authorization systems, autonomous vehicle features, and other functionality.

In some embodiments, the BCM 193 may communicate and/or coordinate the functions for robotic vehicle control in conjunction with or via a dynamic object following controller 196. The 196, described in greater detail with respect to FIG. 2, may cause the processor 150 to predict trajectories of the robotic vehicle 105 with control commands, and cause the processor 150 to apply an optimal control command based on optimized cost values by computing a plurality of such values along each trajectory of the robotic vehicle 105. The dynamic object following controller 165 may cause the processor 150 to compute the optimal control commands without an optimization solver, and may cause the processor 150 to adjust a response speed of the robotic vehicle to account for the dynamic motion of the target object (e.g., the dynamic object 140).

The computing system architecture of the robotic vehicle computer 145, VCU 165, and/or the predictive time horizon robotic motion control system 107 may omit certain computing modules. It should be readily understood that the computing environment depicted in FIG. 1 is an example of a possible implementation according to the present disclosure, and thus, it should not be considered limiting or exclusive.

The sensory systems 182 may provide the sensory data obtained from the sensory system 182 responsive to an internal sensor request message. The sensory data may include information from various sensors where the sensor request message can include the sensor modality with which the respective sensor system(s) are to obtain the sensory data.

The sensory system 182 may include one or more camera sensor(s) 177, which may include thermal cameras, optical cameras, and/or a hybrid camera having optical, thermal, or other sensing capabilities. Thermal and/or infrared (IR) cameras may provide thermal information of objects within a frame of view of the camera(s), including, for example, a heat map figure of a subject in the camera frame. An optical camera may provide RGB and/or black-and-white and depth image data of the target(s) and/or the robot operating environment within the camera frame. The camera sensor(s) 177 may further include static imaging, or provide a series of sampled data (e.g., a camera feed).

The sensory system 182 may further include an inertial measurement unit IMU (not shown in FIG. 1), which may include a gyroscope, an accelerometer, a magnetometer, or other inertial measurement device.

The sensory system 182 may further include one or more lighting systems such as, for example, a flash light source 179, and the camera sensor(s) 177. The flash light source 179 may include a flash device, similar to those used in photography for producing a flash of artificial light (typically $\frac{1}{1000}$ to $\frac{1}{200}$ of a second) at a color temperature of about 5500 K to illuminate a scene, and/or capture quickly moving objects or change the quality of light in the operating environment 100. Flash refers either to the flash of light itself or to the electronic flash unit (e.g., the flash light source 179) discharging the light. Flash units are commonly built directly into a camera. Some cameras allow separate flash units to be mounted via a standardized "accessory mount" bracket (a hot shoe).

The dynamic object following controller 196 may include program code and hardware configured and/or programmed for obtaining images and video feed via the VPS 181, and performing semantic segmentation using IR thermal signatures, RGB images, and combinations of RGB/depth and IR thermal imaging obtained from the sensory system 182. Although depicted as a separate component with respect to the robot vehicle computer 145, it should be appreciated that any one or more of the ECUs 117 may be integrated with and/or include the robot vehicle computer 145.

Figure 2:
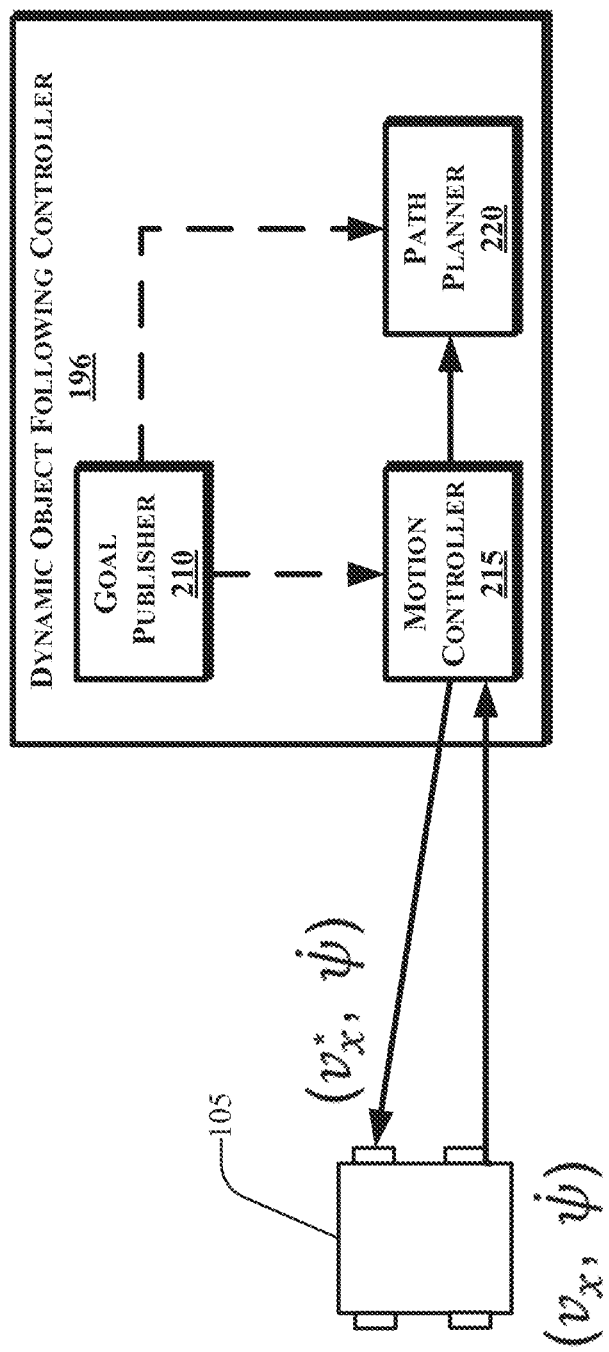
FIG. 2 illustrates an example schematic of a dynamic object following controller in accordance with the present disclosure.

FIG. 2 illustrates an example schematic of a dynamic object following controller 196 in accordance with the present disclosure. The dynamic object following controller 196 may include a goal publisher 210, a motion controller 215, and a path planner 220, in accordance with an embodiment.

The goal publisher 210 represents a physical and/or code module of the controller 195 that may detect a dynamic target such as a person or other robotic vehicle, and track the location of the dynamic object as it changes position. The goal publisher 210 may publish a location of the dynamic target if a condition, such as a time period and/or a minimum displacement is met, such that the motion controller 215 may use the tracked position of the dynamic target as a goal.

The path planner block plans a path from the robotic vehicle 105 to the goal (e.g., the position of the dynamic target), and utilizes a planned path as navigational instructions or guidance for the motion controller to determine an optimized maneuver. The planner block may plan the path based on control commands that satisfy longitudinal and rotational velocity rules, among other metrics described in the following sections.

The dynamic object following controller 196 may compute control commands at an update frequency, e.g., 10 Hz, 8 Hz, 15 Hz, etc. At every update time step, the dynamic object following controller 196 may construct a search space having a plurality of sampled values of the longitudinal velocity $v_x$ and rotational velocity (yaw rate) $\dot{\psi}$, as shown in FIG. 2.

Figure 3:
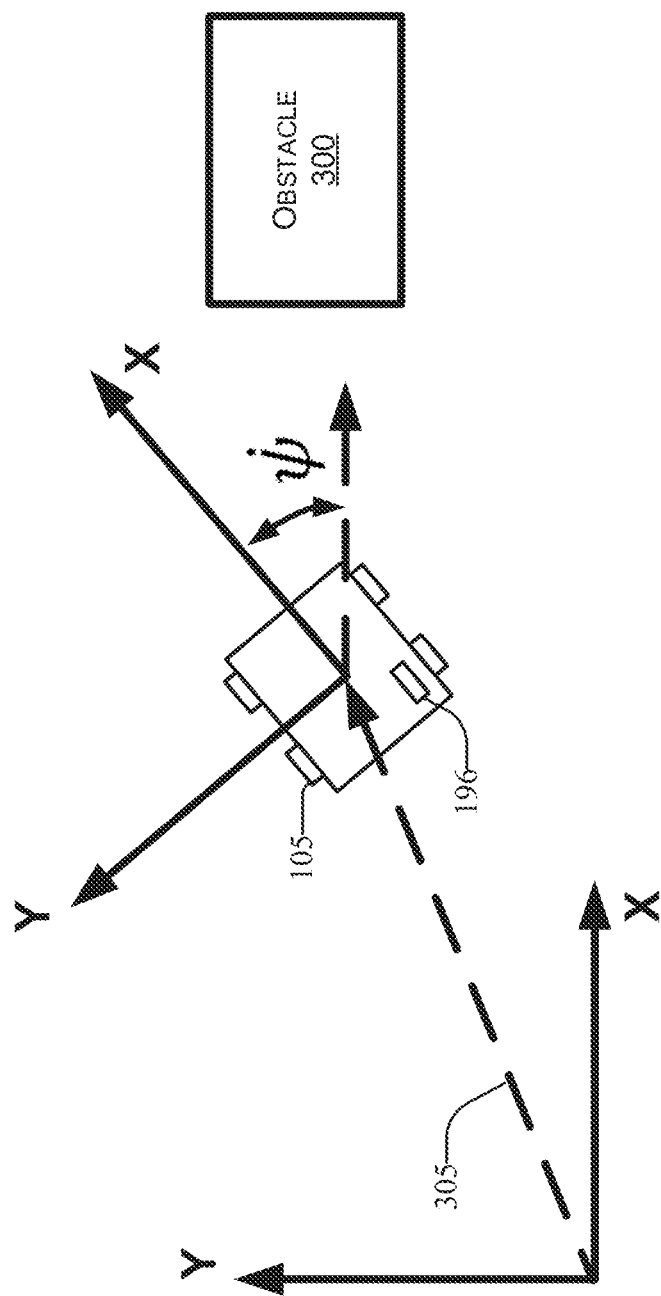
FIG. 3 depicts an example optimal predicted trajectory in accordance with the present disclosure.

FIG. 3 depicts an example optimal predicted trajectory 305 in accordance with the present disclosure. For each combination of ($v_x$, $\dot{\psi}$), the dynamic object following controller 196 may predict the trajectory of the robotic vehicle 105 based on the plurality of (v_x, $\dot{\psi}$) samples, and calculate a cost incurred as it moves along a predicted trajectory.

Figure 4:
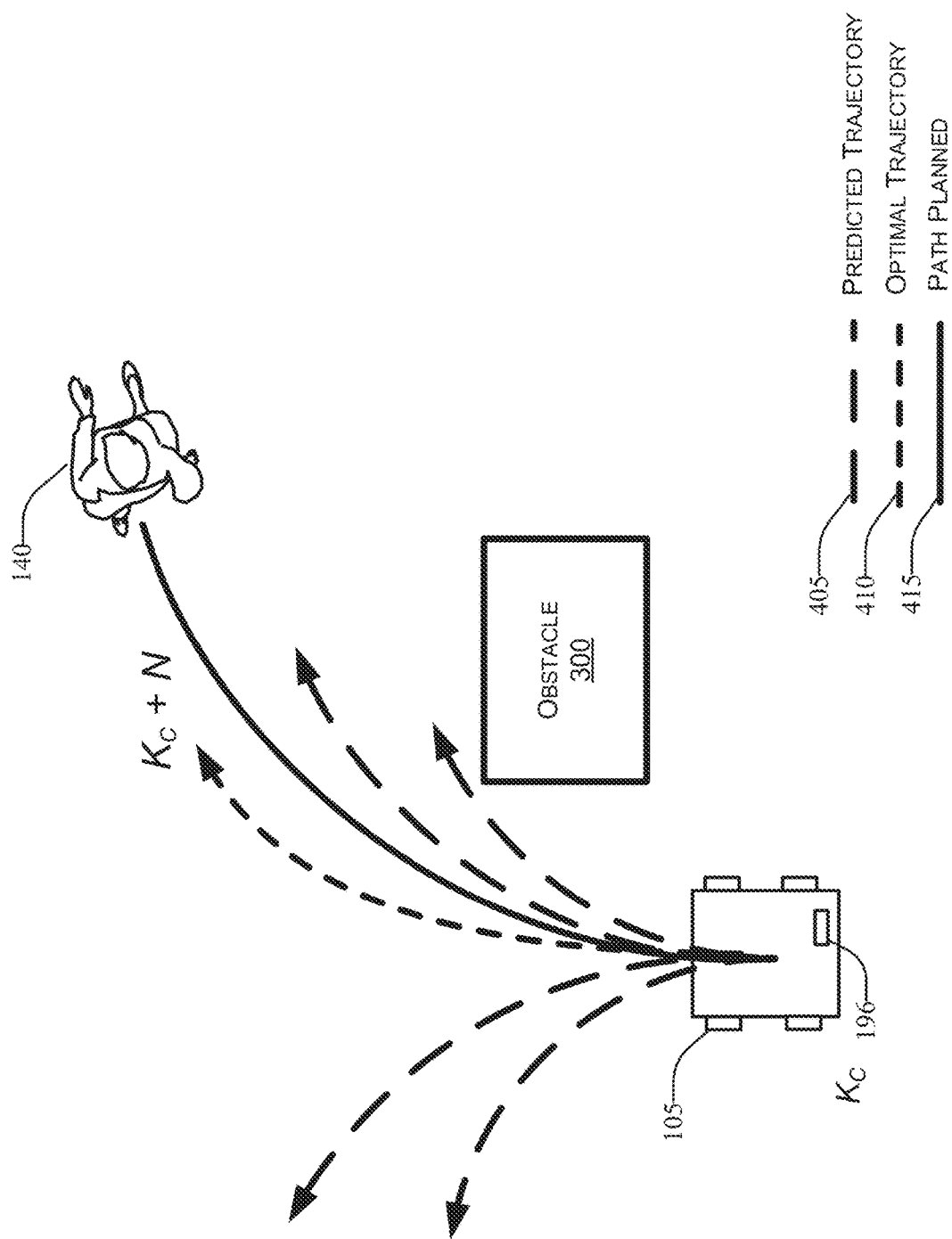
FIG. 4 depicts an example optimal predicted trajectory in accordance with the present disclosure.

FIG. 4 depicts an example optimal trajectory 410 chosen by the dynamic object following controller 196 among a plurality of predicted trajectories 405, in accordance with the present disclosure. The term $k_c$ represents a time step when the motion controller predicts the trajectory, and the term N represents a prediction time step horizon. Then, the dynamic object following controller 196 may apply a trajectory of ($v_{x*}$, $\dot{\psi}*$) sample with the minimal cost to the mobile robot to create the dynamic object following maneuvers. The minimal cost may be an optimized cost having the smallest negative impact to a physical parameter associated with the robotic vehicle motion as it tracks the dynamic object 140. According to one or more embodiments, the controller 195 may compute the minimal cost using a cost function.

Figure 5:
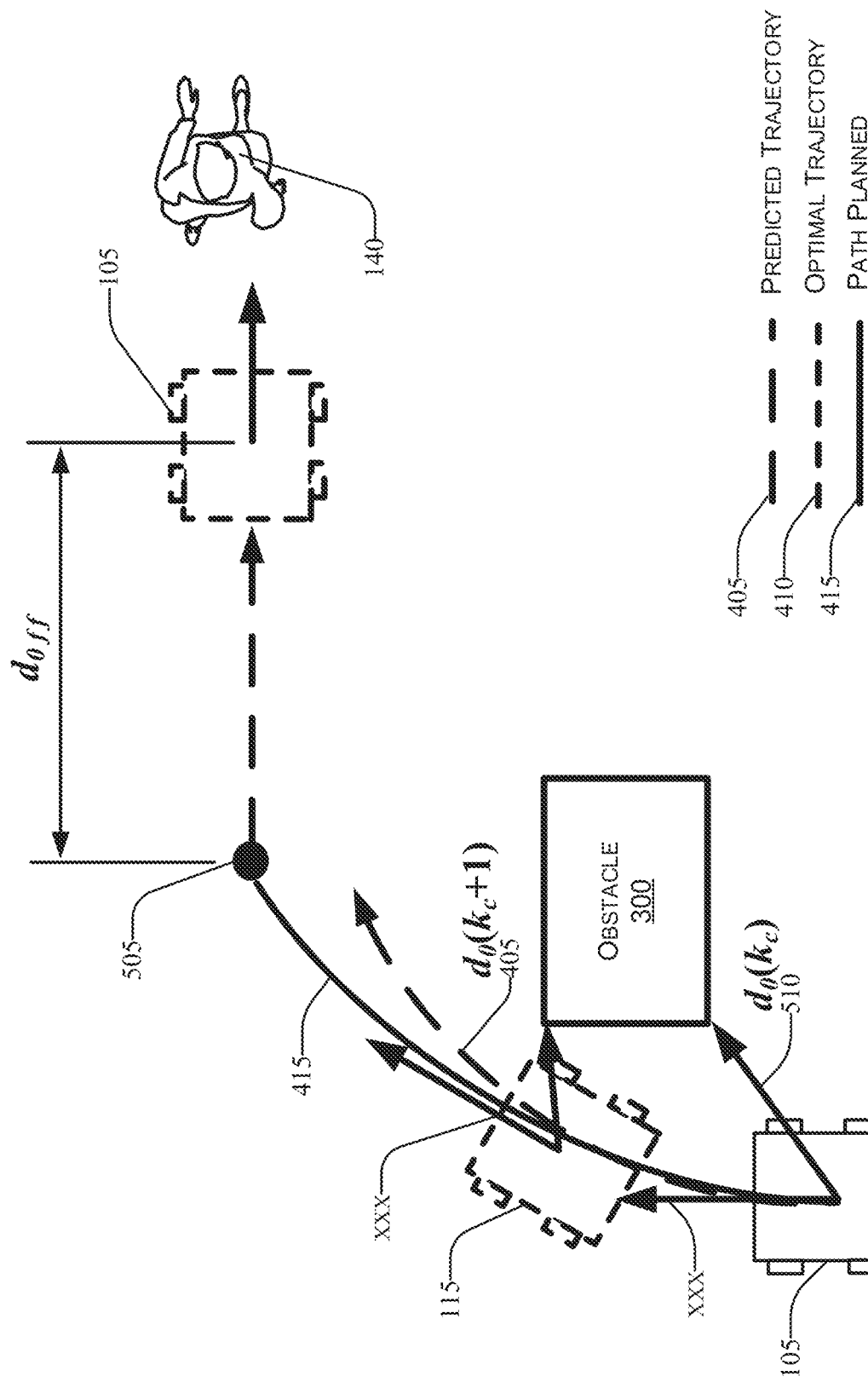
FIG. 5 illustrates an example of determining a cost for collision avoidance in accordance with the present disclosure.

FIG. 5 illustrates an example of determining a cost for collision avoidance in accordance with the present disclosure. The dynamic object following controller 196 may determine a cost for each predicted trajectory 405 based on the values ($v_x$, $\dot{\psi}$) determined using a plurality of samples taken as the robotic vehicle progresses along the path planned 415. The cost includes four terms 1a, 1b, 1c, and 1d, as follows.

cost function $$= \omega_o \max\left(\{h_o(d_o(i))^2\}_{i=k_c}^{k_c+N}\right) \quad (1a)$$

$$+\omega_{ay} \max\left(\{a_y(i)^2\}_{i=k_c}^{k_c+N}\right) \quad (1b)$$

$$+\omega_g \, d_g(k_c + N)^2 \quad (1c)$$

$$+\omega_p \sum_{j=0}^{N} d_p(k_c + j)^2 \quad (1d)$$

In the above cost function, the term $\omega$ represent weights that may be applied to the cost function for each of the cost terms (e.g., $\omega_o$, $\omega_{ay}$, $\omega_g$, and $\omega_p$).

When the dynamic object following controller 196 choses the optimal trajectory 410, the dynamic object following controller 196 may assign a weighted cost value for each possible trajectory (e.g., the predicted trajectory 405 as shown in FIG. 4). The dynamic object following controller 196 may cause the processor 150 (shown in FIG. 1) to determine a maximum value for an inverse of a minimum distance value from the robotic vehicle 105 to the dynamic object 140. The goal 505 may represent an ideal position for the robotic vehicle 105 that allows a safe following distance $d_{off}$ without undue probability of losing cargo due to rapid changes of acceleration and direction.

The robotic vehicle 105 may follow the path planned 415 to reach the goal 505 such that the dynamic object following controller 196 causes the processor 150 to determine a minimum distance 510 to the obstacle 300 along the path planned 415. This determination may mitigate any collision risk between the robotic vehicle 105 and the obstacle 300. Accordingly, the dynamic object following controller 196 may invert the minimum distance 510, and minimize the inverted quantity as outlined in the following section, which may increase the sensitivity of the dynamic motion control for the robotic vehicle 105.

The first cost term (1a) may enable collision avoidance with obstacles such as the obstacle 300. The function $h_o$ may be and/or include a function that is inversely proportional $d_o$ to a distance at time k from the robotic vehicle 105 to the obstacle 300. When the robot reaches a goal position (not shown in FIG. 4) and observes the obstacle 300, it may be advantageous to be as far from the obstacle 300 as possible to minimize a risk of collision with the obstacle. The maximum value for $1/d_o$ means that if the robotic vehicle 105 follows along one trajectory, then measures a minimum distance $d_o$ to the obstacle 300, at the beginning of the trajectory 405 the distance $d_o$ is a length, and a 510 distance is a length. The system may determine the minimum distance 510, then invert that value. The dynamic object following controller 196 may invert the minimum distance $d_o(k)$ 405 to increase the sensitivity of the dynamic motion control. Therefore, the term accounts for a location 115 where the robotic vehicle 105 navigates closest to the obstacle 300 along the predicted trajectory 405 at time k+1, as shown by the term $d_0(k_c+1)$.

In the second cost term (1b), the dynamic object following controller 196 may determine a largest lateral acceleration $a_y$. Accordingly, the controller 195 may calculate the cost term (1b) as it travels along the predicted trajectory 405, which may decrease a probability of collision between the robotic vehicle 105 and the obstacle 300 while the vehicle is turning. If the robotic vehicle 105 does not slow down in a sharp turn to follow the dynamic object 140, the robotic vehicle 105 may lose contact with the ground and slide, or lose cargo loaded onboard the vehicle (cargo not shown in FIG. 5). Accordingly, the lateral acceleration term $a_y$ is included in the cost function, which may promote safer maneuverability for the robotic vehicle 105.

Figure 6:
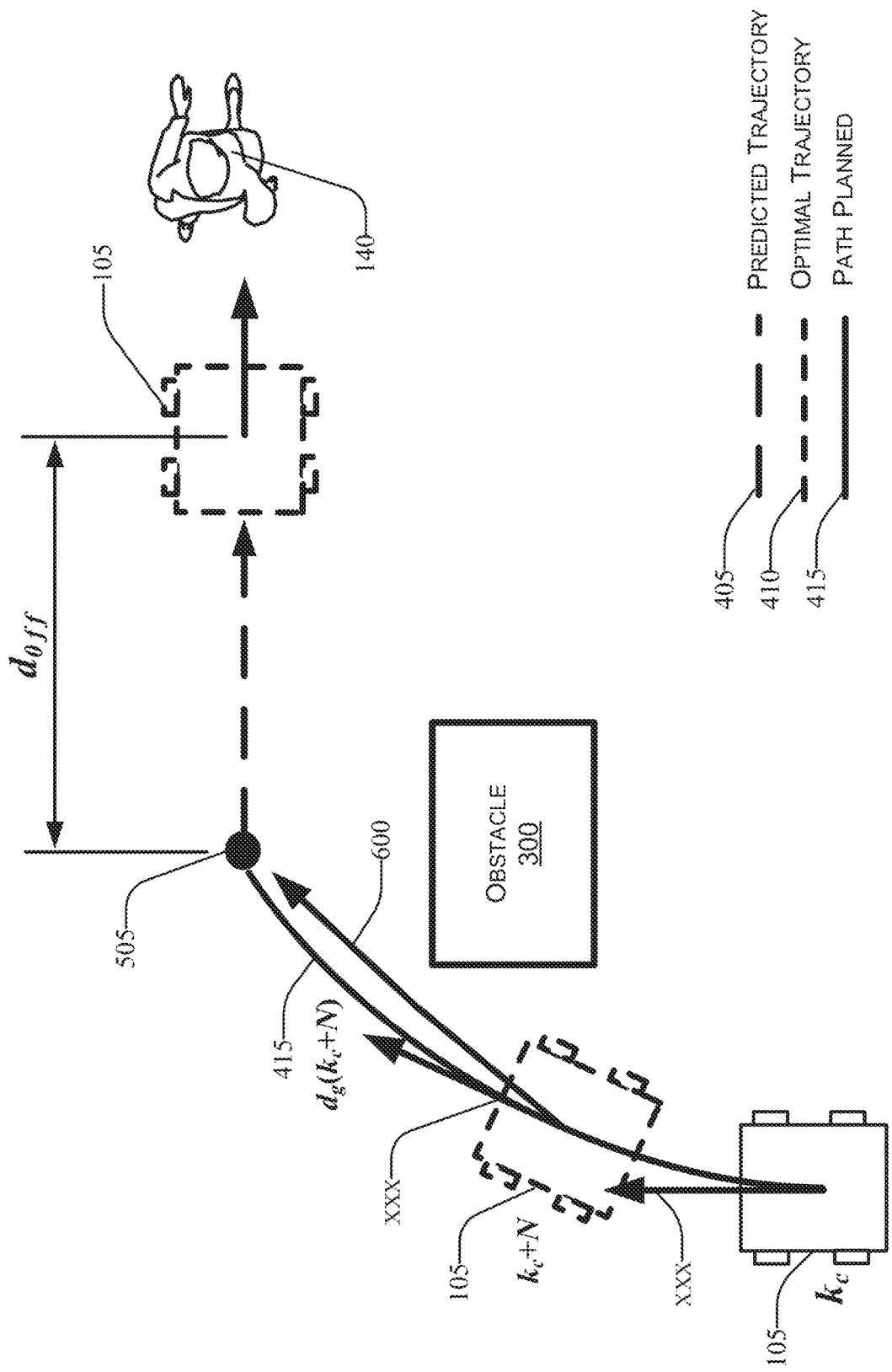
FIG. 6 illustrates determining a cost for heading to a dynamic goal in accordance with the present disclosure.

FIG. 6 illustrates determining a distance to goal $d_g$ cost while heading toward the dynamic object 140, in accordance with the present disclosure. To head for a goal 505, the distance to goal $d_g$ is included as the third cost (1c). Note that the distance to goal $d_g$ at the end of the predicted trajectory 405 is used, and the distance is not a straight airline distance 600 to account for the distance required to navigation without collision with obstacle 300.

Figure 7:
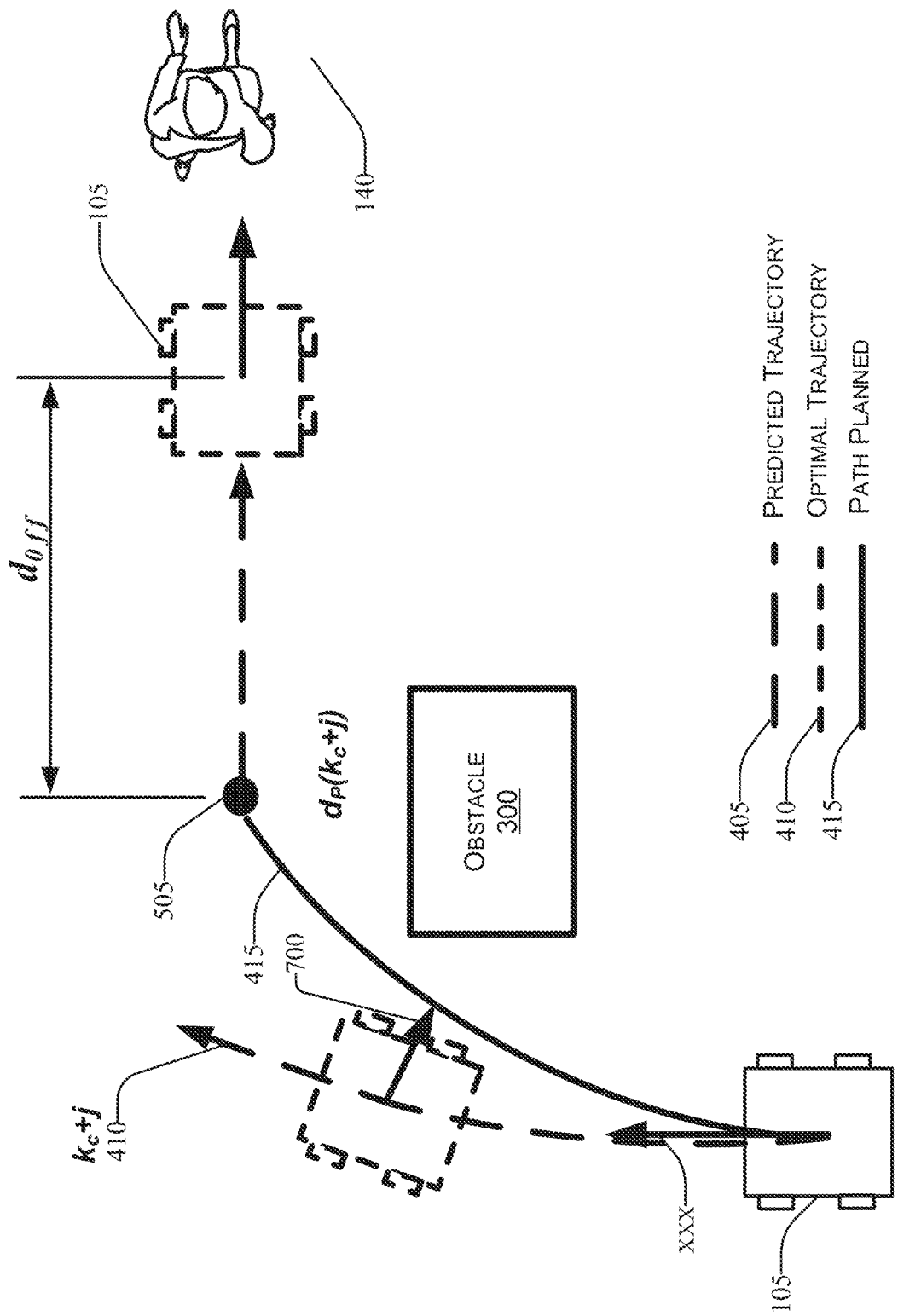
FIG. 7 depicts a demonstration of quality of paths followed using an algorithm trained using the setup of FIG. 5 in accordance with the present disclosure.

FIG. 7 depicts a determining a distance from the robotic vehicle 105 to the planned path $d_p$, in accordance with the present disclosure. The fourth term (1d) contains the distance 700 from the robotic vehicle 105 to the planned path $d_p$, and therefore, this cost term is utilized for tight path following. If a path is planned periodically to reflect dynamic environment, the dynamic object following controller 196 may utilize the path planned 415 as guidance for navigation of the robotic vehicle 105. Therefore, following the path planned 415 tightly (with minimal deviations away from the path planned 415) can be helpful for the robotic vehicle 105 to maneuver around the obstacle 300.

The robotic vehicle 105 may determine tasks to follow the planned path from a present robot location (shown in solid lines) to the goal 505. The dynamic object following controller 196 may predict the predicted trajectory 405 (where a localized position of the robotic vehicle 105 is illustrated in dashed lines, where the robotic vehicle has deviated from the path planned 415). Along the trajectory, the dynamic object following controller 196 may compute the distance from the path planned 415, and minimize the distance deviated from the path planned 415 $d_P(k_c+j)$ such that the path planned 415 is followed as tightly as possible.

According to one embodiment, the dynamic object following controller 196 may track accelerations to constant reference velocities such that the robotic vehicle optimizes a following distance without acceleration that causes the robotic vehicle 105 to lose cargo or become imbalanced and slip. The dynamic object following controller 196 may determine a response speed (e.g., feedback gains $k_i$) for executing control commands that may be indicative of how quickly the robotic vehicle 105 may respond to the highly dynamic position of the target object (e.g., the dynamic object 140 being followed). The dynamic object following controller 196 may obtain the optimal trajectory samples $(v_{x*}, \psi^*)$ and utilize the steady state reference tracking control to define linear and rotational accelerations. Stated another way, the accelerations may be modeled such that the robotic vehicle 105 can converge to constant reference velocities $v^{xref}$ and $\psi^{ref}$ over the prediction time horizon $\tau_h = N_\tau$ (where $\tau$ is a sampling time). An example mathematical model is represented as $$\begin{bmatrix} a_x(k) \\ \ddot{\psi}(k) \end{bmatrix} = \begin{bmatrix} K_x(v_x^{ref} - v_x(k)) \\ K_\psi(\dot{\psi}^{ref} - \dot{\psi}(k)) \end{bmatrix},$$

where the feedback gains are $$K_i = \frac{1 - p_i}{\tau}; \text{ for } i \in \{x, \psi\}.$$

With the above approach, the accelerations are constrained to functions of the constant reference velocity tracking. In the definition of gain, $p_i$ represents a parameter, such as, for example, the closed loop pole, that determines the rate of convergence, and its absolute value should be $|p_i|<1$ for stability. As the value of $p_i$ becomes smaller, the velocity of the robotic vehicle 105 converges to the reference velocity faster.

By substituting the $(v_x, \psi)$ sample into $(v_{xref}, \psi^{ref})$, we can predict the trajectory with the $(v_x, \psi)$ sample values fixed over the prediction time horizon, and this enables us to construct the search space in the 2-dimensional space. If we do not use this approach, the accelerations could change to generate any values of $(y_x, \psi)$ over the prediction time horizon, which results in the explosion of the dimension of search space.

Therefore, with the accelerations defined to track the constant reference velocities, the optimal $(v_{x^{\wedge}*}, \psi^*)$ can be found with a significantly reduced computational cost.

With a robotic vehicle 105 whose maximum speed is around 2.5 m/s (as an example), we do not have to sample $v_x$ values at a fine resolution (e.g., 0.001 m/s), and therefore the 2-dimensional search space can be discretized with the reasonably small number of $v_x$ samples. Similarly, the number of $\psi$ samples should be reasonably small. Therefore, the proposed motion controller can find the optimal $(v_{x*}, \psi^*)$ without a separate optimization solver.

Figure 8:
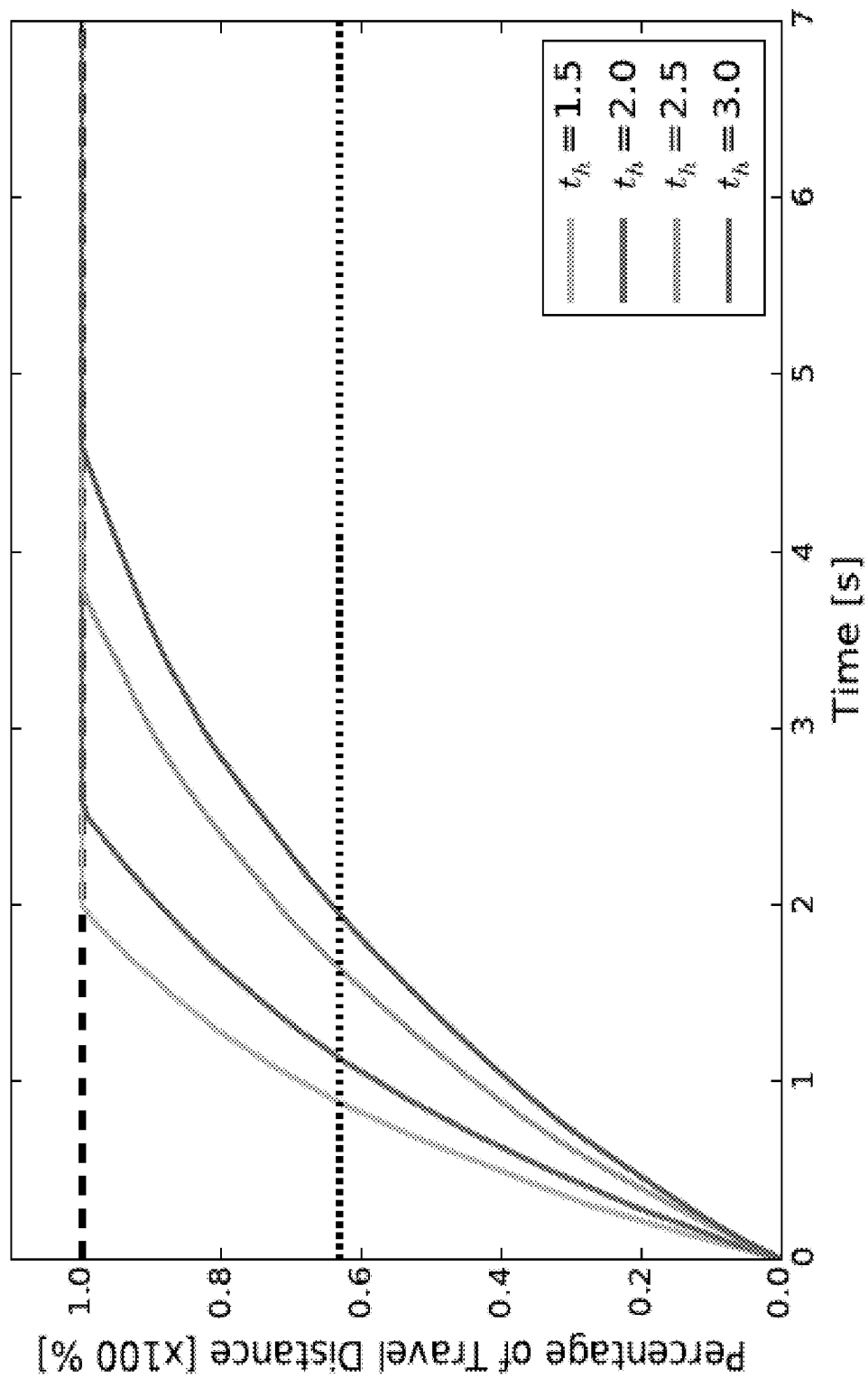
FIG. 8 depicts a graph of response speeds using different prediction time horizons in accordance with the present disclosure.

FIG. 8 depicts a graph of response speeds using different prediction time horizons in accordance with the present disclosure. If the above accelerations are utilized, the motion controller applies the optimal $(v_{x*}, \psi^*)$ to the low level motor controller at every update time step. Considering the cost of the distance to the goal at the end of the predicted trajectory, the $(y_{x*}, \psi^*)$ is obtained as a result of trying to reach the goal location at the end of the prediction time horizon $t_h$. This interpretation holds for $(v_{x*}, \psi^*)$ at every time step. Therefore, if we use a smaller $t_h$, the robotic vehicle 105 tries to reach the goal 505 faster than with a larger $t_h$, as shown in FIG. 8. Then, the prediction time horizon $t_h$ can be used to adjust transient response in following the dynamic object 140 (shown in previous figures). In other words, the prediction time horizon provides a way to determine how quickly the robotic vehicle 105 responds to motion of the dynamic object 140.

An initial assumption can be made as to a constant velocity of the robotic vehicle 105, then change the initial assumption according to the feedback gains $k_i$. The prediction time horizon may serve as a time constant (e.g., the response speed may be determined according to that time constant). This metric shows how quickly the robotic vehicle can reach the goal. The system 107 may measure the time taken for the vehicle to reach approximately 63.2% of the distance to goal.

If we have a small value for the PTH, the vehicle can reach the goal faster than using a larger value for $t_h$. Due to the compound function . . . you can show the $t_h$ to show the responsive speed. The $t_h$ may therefore be useful to adjust the response speed of the robotic vehicle while minimizing risk due to collisions and losing cargo being delivered by the robotic vehicle while en route to the final destination.

Figure 9:
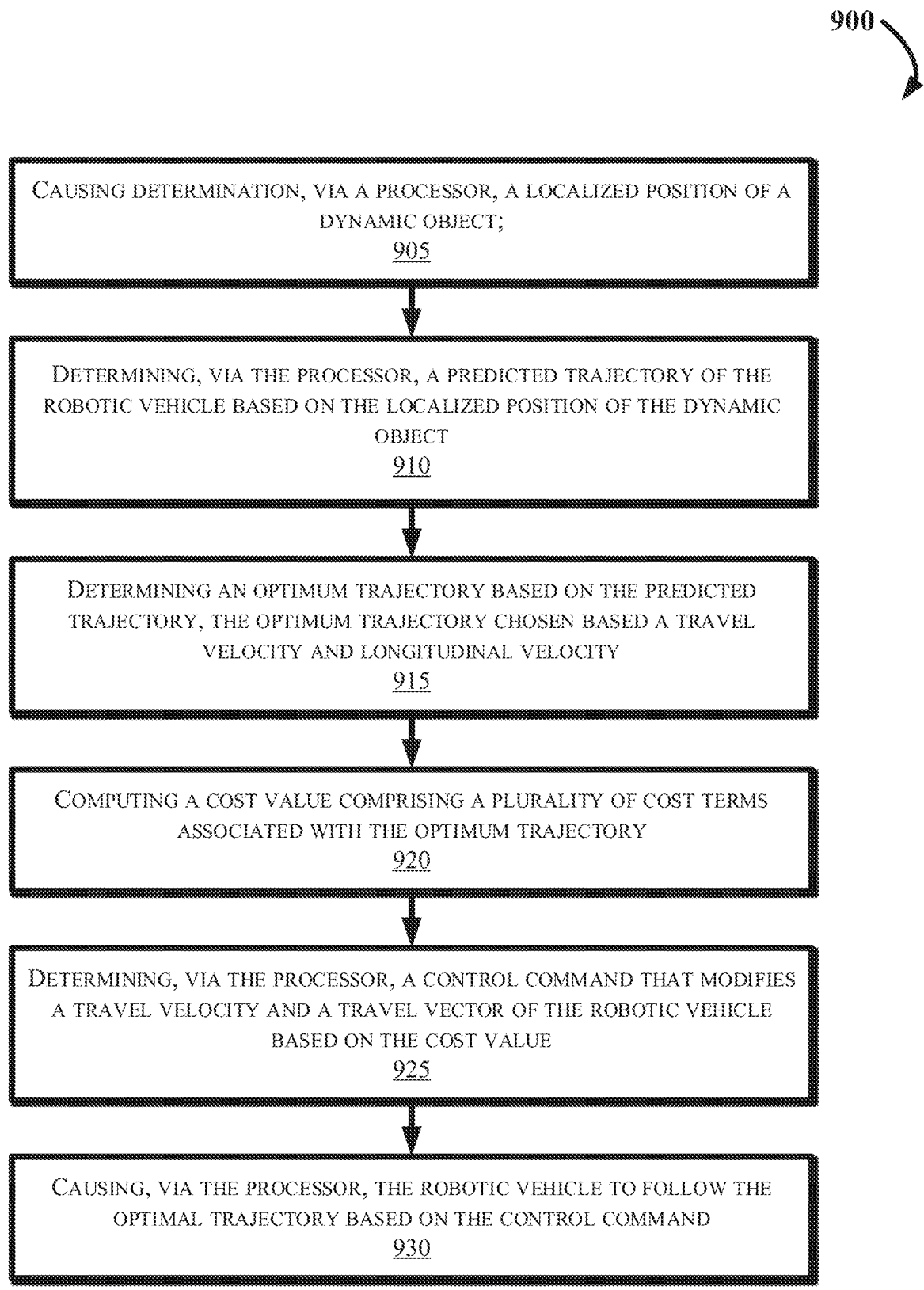
FIG. 9 depicts a flow diagram of an example method for controlling a robotic vehicle using the dynamic object following controller in accordance with the present disclosure.

FIG. 9 depicts a flow diagram of an example method for controlling a robotic vehicle using the dynamic object following controller in accordance with the present disclosure. FIG. 9 may be described with continued reference to prior figures, including FIGS. 1-7. The following process is exemplary and not confined to the steps described hereafter. Moreover, alternative embodiments may include more or less steps that are shown or described herein, and may include these steps in a different order than the order described in the following example embodiments.

Referring first to FIG. 9, at step 905, the method 900 may commence with causing determination, via a processor, a localized position of a dynamic object.

At step 910, the method 900 may further include determining, via the processor, a predicted trajectory of the robotic vehicle based on the localized position of the dynamic object.

At step 915, the method 900 may further include determining an optimum trajectory based on the predicted trajectory, the optimum trajectory chosen based a travel velocity and longitudinal velocity. This step may further include computing a cost value comprising a plurality of cost terms associated with the optimum trajectory, and determining, via the processor, a control command that modifies a travel velocity and a travel vector of the robotic vehicle based on the cost value. In one embodiment, the plurality of cost terms comprises a distance at a time k from the robotic vehicle to an obstacle, a minimum distance value from the robotic vehicle to a dynamic target, a lateral acceleration value indicative of a linear acceleration and a rotational acceleration, and a distance from the robotic vehicle to the dynamic target.

At step 920, the method 900 may further include computing a cost value comprising a plurality of cost terms associated with the optimum trajectory. This step may include computing the control command at a predetermined update frequency, constructing a search space comprising sampled values for longitudinal velocity and rotational velocity, and predicting the trajectory of the robotic vehicle based on a combination of the longitudinal velocity and rotational velocity.

At step 925, the method 900 may further include determining a control command that modifies a travel velocity and a travel vector of the robotic vehicle based on the cost value.

In other aspects, this step may further include causing to sense, via the processor, an obstacle proximate the robotic vehicle and the dynamic object. This step may further include determining a maximum value for an inverse of a minimum distance value from the robotic vehicle to a dynamic target.

At step 930, the method 900 may further include causing, via the processor, the robotic vehicle to follow the optimal trajectory based on the control command.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for controlling a robotic vehicle, comprising:
causing determination, via a processor, a localized position of a dynamic object;
determining, via the processor, a predicted trajectory of the robotic vehicle based on the localized position of the dynamic object;
determining an optimum trajectory based on the predicted trajectory, the optimum trajectory chosen based on a travel velocity comprising an intended velocity and a longitudinal velocity comprising a current velocity;
computing a cost value comprising a plurality of cost terms associated with the optimum trajectory;
determining, via the processor, a control command that modifies a travel velocity and a travel vector of the robotic vehicle based on the cost value, wherein determining the control command of a plurality of control commands comprises
computing the control command at a predetermined update frequency,
constructing a search space comprising sampled values for longitudinal velocity and rotational velocity, and predicting the trajectory of the robotic vehicle based on a combination of the longitudinal velocity and rotational velocity;

determining a response speed for executing the control command based on linear acceleration and rotational acceleration; and causing, via the processor, the robotic vehicle to follow the optimal trajectory based on the control command.

2. The method according to claim 1, wherein the plurality of cost terms comprises:

a minimum distance value from the robotic vehicle to a dynamic target;

a lateral acceleration value indicative of a linear acceleration and a rotational acceleration; and a distance from the robotic vehicle to the dynamic target.

3. The method according to claim 1, wherein computing the control command comprises:

causing to sense, via the processor, an obstacle proximate the robotic vehicle and the dynamic object.

4. The method according to claim 3, wherein computing the control command further comprises:

determining a maximum value for an inverse of a minimum distance value from the robotic vehicle to a dynamic target.

5. The method according to claim 1, wherein computing the cost value comprises:

computing the plurality of cost terms associated with the optimum trajectory at a predetermined frequency as the robotic vehicle travels along the optimum trajectory; and determining the control command at the predetermined frequency.

6. A non-transitory computer-readable storage medium having instructions stored thereupon which, when executed by a processor, cause the processor to:

determine, a localized position of a dynamic object;

determine a predicted trajectory of a robotic vehicle based on the localized position of a dynamic object;

determine an optimum trajectory based on the predicted trajectory, the optimum trajectory chosen based on a travel velocity and longitudinal velocity;

computing a cost value comprising a plurality of cost terms associated with the optimum trajectory;

determining a control command that modifies a travel velocity and a travel vector of the robotic vehicle based on the cost value;

causing the robotic vehicle to follow the optimal trajectory based on the control command; and determine a response speed for executing the control command based on linear acceleration and rotational acceleration.

7. The non-transitory computer-readable storage medium of claim 6, wherein the plurality of cost terms comprises:

a minimum distance value from the robotic vehicle to a dynamic target;

a lateral acceleration value indicative of a linear acceleration and a rotational acceleration; and a distance from the robotic vehicle to the dynamic target.

8. The non-transitory computer-readable storage medium of claim 6, the instructions further causing the processor to:

compute the control command at a predetermined update frequency;

construct a search space comprising sampled values for longitudinal velocity and rotational velocity; and predict the trajectory of the robotic vehicle based on a combination of the longitudinal velocity and rotational velocity.

9. The non-transitory computer-readable storage medium of claim 6, the instructions further causing the processor to:

cause to sense an obstacle proximate the robotic vehicle and the dynamic object.

10. The non-transitory computer-readable storage medium of claim 6, the instructions further causing the processor to:

determine a maximum value for an inverse of a minimum distance value from the robotic vehicle to a dynamic target.

11. The non-transitory computer-readable storage medium of claim 6, the instructions further causing the processor to:

compute the plurality of cost terms associated with the optimum trajectory at a predetermined frequency as the robotic vehicle travels along the optimum trajectory; and determine the control command at the predetermined frequency.

12. A non-transitory computer-readable storage medium having instructions stored thereupon which, when executed by a processor, cause the processor to:

determine, a localized position of a dynamic object;

determine a predicted trajectory of a robotic vehicle based on the localized position of a dynamic object;

determine an optimum trajectory based on the predicted trajectory, the optimum trajectory chosen based a travel velocity and longitudinal velocity;

computing a cost value comprising a plurality of cost terms associated with the optimum trajectory;

determining a control command that modifies a travel velocity and a travel vector of the robotic vehicle based on the cost value;

determine a maximum value for an inverse of a minimum distance value from the robotic vehicle to a dynamic target; and causing the robotic vehicle to follow the optimal trajectory based on the control command.

* * * * *